United States Patent Office
3,766,083
Patented Oct. 16, 1973

3,766,083
FLUORESCENT WHITENING COMPOSITIONS
Theodore A. Langstroth, Cincinnati, and Arthur S. Neave, Jr., Indian Hill, Ohio, assignors to Sterling Drug Inc., New York, N.Y.
No Drawing. Filed Apr. 12, 1971, Ser. No. 133,341
Int. Cl. D06b 3/12
U.S. Cl. 252—301.2 W 3 Claims

ABSTRACT OF THE DISCLOSURE

Aqueous compositions of tetra-alkali metal salts of 4,4'-bis(4 - p-sulfoanilino-6-diisopropanolamino-s-triazin-2-yl-amino)-2,2'-stilbenedisulfonic acid which are stable and have excellent pot life when used for whitening cellulose fibers concomitantly with their treatment with conventional thermosetting textile resins.

---

This invention relates to fluorescent whitening compositions and to processes for the preparation thereof. More particularly, it relates to aqueous optical whitening solutions adapted for concomitantly whitening cellulose fibers such as cotton with application of conventional thermosetting textile resins.

Textile manufacturers and finishers often treat cotton fabrics with heat curable resins to impart crease resistance and wash-and-wear properties to the fibers. A procedure widely used in the textile industry for resin finishing cotton fabrics consists of padding the textile in an aqueous solution in which there is dissolved a thermosetting resin, for example, a cyclic urea type or imidazolidone type and a hard-curing acid-type accelerator, for example zinc nitrate, zinc floroborate, magnesium chloride, etc. which initiates polymerization at the curing stage. After padding, the monomer-impregnated textile is cured at an elevated temperature to obtain a fabric which is crease-resistant and requires little or no ironing after washing.

Heretofore the simultaneous treatment of cotton fabrics with thermosetting textile resin finishes and optical brighteners has been difficult because most of the known fluorescent brighteners have been found either to be incompatible with or to give unsatisfactory results with acid-type accelerators which are generally used with the resin monomers. The accelerators cause the brightener to precipitate from the resin-accelerator-brightener solution which results in streaking and a loss of whitening effectiveness on fabric padded with the solution. Moreover, many of the brighteners in use today suffer from very short and unsatisfactory pot life when used in combination with the resin monomers and accelerators. Thus, a brightener that has good pot life produces no turbidity in a monomer-accelerator mixture and also produces the same level of dyeing from such a mixture several hours after mixing as it does when the mixture is freshly prepared. The difficulties of incompatability and short pot life can, of course, be obviated by treating the fabric with brightener in a separate operation. However, a separate padding for the whitening step requires additional equipment, more time for processing and consequently increases the cost of the finished textile. Additionally, a short pot life tends to increase the cost for brighteners since additional quantities must be added to maintain constant dyeing levels.

It is an object of this invention to provide a liquid, aqueous, fluorescent whitening composition which is compatible with resins and which retains its whitening effect when incorporated in an effective whitening concentration in conventional aqueous thermosetting textile resin finish solutions. It is another object to provide such a composition which has good pot life, that is, one which produces substantially undiminished dyeing level from a resin-accelerator-brightener composition at least several hours after preparation, and which gives no turbidity in the ageing resin-accelerator mixture. It is a further object to provide aqueous liquid brightener compositions which are stable solutions at ambient temperatures as low as 15° F.

The above-stated objects are met in accordance with the instant invention.

In its composition aspect, the invention sought to be patented resides in a stable, aqueous fluorescent whitening composition for whitening cotton fibers concomitantly with the application of thermosetting textile resins which contains as the essential fluorescent whitening ingredient a dissolved tetra-alkali metal salt of 4,4'-bis(4-p-sulfoanilino-6-diisopropanolamino-s-triazin-2-ylamino) - 2,2'-stilbenedisulfonic acid and a co-solvent selected from the group consisting of polyhydric alcohols, diglycol ethers, polyethylene glycols of the formula $H(OCH_2CH_2)_nOH$, wherein $n$ is an integer from 4 to 6, and alkanolamines of the formula $(HO\text{-alk})_p\text{—}NR_{3-p}$ wherein alk is a bivalent alkane radical of 2 to 4 carbon atoms, R is hydrogen or alkyl of 1 to 2 carbon atoms, and $p$ is an integer from 1 to 3.

In its method aspect, the invention sought to be patented resides in the method of producing fluorescently whitened, resin-treated cotton fibers which comprises contacting the resin-free fibers with an effective amount of a stable aqueous, fluorescent whitening composition which contains as the essential fluorescent whitening ingredient a dissolved tetra-alkali metal salt of 4,4'-bis(4-p-sulfoanilino-6-diisopropanolamino - s - triazin-2-ylamino)-2,2'-stilbenedisulfonic acid; and a co-solvent selected from the group consisting of polyhydric alcohols, diglycol ethers, polyethylene glycols of the formula $H(OCH_2CH_2)_nOH$, wherein $n$ is an integer from 4 to 6, and alkanolamines of the formula $(HO\text{-alk})_p\text{—}NR_{3-p}$ wherein alk is a bivalent alkane radical of 2 to 4 carbon atoms, R is hydrogen or alkyl of 1 to 2 carbon atoms, and $p$ is an integer from 1 to 3, concomitantly with the application of the textile treating resin.

The novel composition of this invention is a stable, liquid, aqueous, fluorescent whitening composition of 4,4'-bis(4-p-sulfoanilino-6-diisopropanolamino - s - triazin-2-ylamino)-2,2'-stilbenedisulfonic acid having the formula

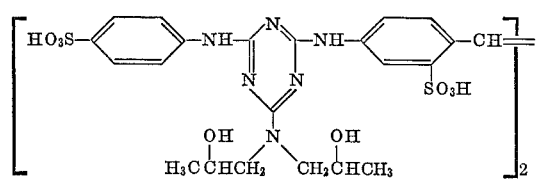

(or equivalently, in the form of its ammonium or tetra-alkali metal salt) and a stability-imparting co-solvent. We have found that our composition produces no turbidity and is unexpectedly stable in an aqueous resin-acid-type accelerator textile padding system. Moreover, our composition retains substantially its full whitening effect when used in such a system and produces the same level of dyeing after several days as when it is freshly prepared. This is in distinct contrast to the results obtained with a commercial aqueous fluorescent whitening composition widely used in the industry. When the commercial product was used in the same manner as the subject composition, the resin-accelerator-brightener mixture became turbid and turned yellow in color shortly after mixing and there was a significant drop in dyeing levels in less than two hours after preparation of the mixture.

These results are all the more unexpected because it has now been found that when an aqueous liquid concentrate prepared in the same way as the subject composition, but containing a tetra-alkali metal salt of 4,4′-bis(4-p-sulfoanilino-6-diethanolamino - s - triazine-2-ylamino)-2,2′-stilbenedisulfonic acid, an optical brightener well-known in the art, in place of the tetra-alkali salt of 4,4′-bis(p-sulfoanilino - 6 - diisopropanolamino - s - triazin-2-ylamino)-2,2′-stilbenedisulfonic acid, is used in the type of resin-accelerator-brightener mixture described herein, the mixture becomes turbid on mixing and the brightener precipitates from the solution. This is particularly surprising because this known brightener and the brightener used in our novel composition are structurally closely related compounds.

The co-solvent is employed to impart stability to the whitening composition in the presence of by-product chloride salts and also to maintain complete solution when the subject aqueous composition is shipped or stored at temperatures as low as 15° F.

When polyhydric alcohols are used as co-solvents, there are included, for example, ethylene glycol, propylene glycol, butylene glycol, glycerin, pentaerythritol, etc.

When diglycol ethers are used as co-solvents, there are included, for example, diethylene glycol, dipropylene glycol, etc. A particularly preferred diglycol ether is dipropylene glycol.

When polyethylene glycols are employed as co-solvents, those having from 4 to 6 ethyleneoxy moieties per molecule are preferred.

When alkanolamines are used as co-solvents, there are included, for example, mono-, di-, and triethanolamines; mono-, di-, and tri-isopropanolamines; and mono-, di-, and tri-butanolamines. Particularly preferred alkanolamines are diethanolamine, diisopropanolamine and triethanolamine.

The respective amounts of the fluorescent whitening agent and the co-solvent in our novel composition can be varied over a wide range of effective concentrations. The concentration used will depend to a large extent on the nature of the system in which the composition is used and the particular results desired. However, in order to provide a composition which is readily adaptable to the various systems used in the textile industry, it is convenient to prepare the subject composition in the form of a marketable concentrate. A preferred aqueous fluorescent whitening composition in accordance with this invention consists essentially of approximately 10 to 30 percent by weight of a water solution of the disodium dipotassium salt of 4,4′-bis(4-p-sulfoanilino-6-diisopropanolamino-s-triazin - 2 - ylamino) 2,2′-stilbenedisulfonic acid and approximately 5 to 15 percent by weight of dipropylene glycol.

The active brightener component of the subject composition, 4,4′-bis(4-p-sulfoanilino-6-diisopropanolamino-s-triazin-2-ylamino)-2,2′-stilbenedisulfonic acid, is a known compound and is produced in its tetra-alkali salt form in conventional manner, for example by interacting cyanuric chloride and an alkali metal salt of sulfanilic acid in approximately equal molecular equivalents to produce a first condensation product, then interacting approximately two molecular equivalents of said first condensation product with one molecular equivalent of 4,4′-diamino-2,2′-stilbenedisulfonic acid to produce a second condensation product; and finally, interacting approximately two molecular equivalents of diisopropanolamine with one molecular equivalent of the second condensation product to yield the desired final product. In each of these three steps, sufficient alkali is added to the reaction mixture to keep it neutral, or nearly so, during the reaction. The alkali, for instance sodium or potassium hydroxide, used in the several steps can be the same or different depending on whether on the one hand it is desired to produce only the tetrasodium or tetrapotassium salt as a final product or on the other hand it is desired that the tetra-alkali metal salt product contain both sodium and potassium cations. The aqueous reaction mixture resulting from the final step will of course contain not only the desired tetra-alkali metal salt of 4,4′-bis(4-p-sulfoanilino-6-diisopropanolamino-s-triazin-2 - ylamino)-2,2′-stilbenedisulfonic acid but also, as by-products, alkali metal chloride in substantial amounts and organic amine hydrochlorides, together with small amounts of any excess reactants.

The whitening agent produced in the foregoing manner can be isolated and purified if desired. However, it is economically advantageous to avoid such procedures and instead, to arrive at a concentrated aqueous solution of the whitening agent by distilling water from the aqueous reaction mixture in which the whitening agent is produced. In this procedure, the addition of a co-solvent to the composition prevents clouding of the solution or the formation of a precipitate produced by the presence of by-product chloride salts.

The treatment of textile fabrics with our novel brightener in admixture with a resin finish system is readily carried out by conventional procedures. For example, in a typical procedure, the cloth is padded in an aqueous solution containing from 0.1 to 0.5 percent (on the weight of the padding solution), of the subject composition containing 20–25 percent of the fluorescent whitening ingredient, 12 percent of a (45 percent type) resin monomer, and 2.5 percent of an (30 percent type) accelerator. The padded cloth is nipped in a roller to about 75–85 percent pickup, dried at room temperature, cured at 325° F. for 3 minutes and finally given an after-wash. The treated fabric thus obtained is beneficially whitened.

Our new composition is readily obtained as a homogenous solution by simply mixing water, a tetra-alkali metal salt of 4,4′ - bis(4 - p - sulfoanilino - 6 - diisopropanolamino-s-triazin - 2 - ylamino) - 2,2′ - stilbendisulfonic acid, and dipropylene glycol or other solubilizing agent in appropriate respective amounts; for, in accordance with a preferred mode of practicing our invention, the dipropylene glycol is mixed with the aqueous mixture in which the tetra-alkali metal salt is produced, after suitable adjustment of the concentration of the tetra-alkali metal salt therein, if needed, using conventional means, as by dilution or evaporation as the case may require. Prior to packaging, the aqueous reaction mixture is clarified by filtration or other suitable means; this can be done either before or after incorporation of the dipropylene glycol.

Our invention is illustrated by the following examples without, however, being limited thereto. In these examples the term "parts" in each instance is used to designate parts by weight unless otherwise indicated.

EXAMPLE 1

An aqueous reaction containing the dissolved disodium dipotassium salt of 4,4′ - bis(4 - p - sulfoanilino - 6 - diisopropanolamino-s-triazin - 2 - ylamino) - 2,2′ - stilbenedisulfonic acid was prepared by conventional reaction steps as follows: into a stirred mixture of 505 parts of finely divided cyanuric chloride, 16 parts of a non-ionic wetting agent (a polyethylene glycol alkylphenyl ether type, Surfynol TG, Airco Chemical), 1630 parts of water and 1800 parts of ice, there was poured a solution obtained by adding 485 parts of sulfanilic acid to a solution of 170 parts of potassium hydroxide in 1630 parts of water. The mixture thus obtained is held at a temperature near 5° C. over a period of one hour and during the resulting reaction the pH was maintained at 7–8 by addition of 50 percent aqueous sodium hydroxide solution. To the resulting mixture, which contained potassium 1-(2,4-dichloro - 1,3,5 - triazinyl - 6 - amino)benzene - 4 - sulphonate, there was added 500 parts of 4,4'-diamino-2,2'-stilbenedisulfonic acid in the form of a 17 percent water slurry. The mixture was gradually warmed over a period of one-half hour to 30° C. and the pH adjusted to 7.0–7.2 by the addition of 50 percent aqueous sodium hydroxide solution. The mixture was held at a temperature in the range 30°–35° C. for one and one-half hours while maintaining the pH at 7.0–7.2 by adding more 50 percent aqueous sodium hydroxide solution as needed. The mixture produced in this manner, which contained the dissolved tetraalkali metal (mixed sodium and potassium) salt of 4,4' - bis(4 - p - sulfoanilino - 6 - chloro-s-triazin-2 - ylamino) - 2,2' - stilbenedisulfonic acid, was heated to 50° C., then 540 parts of diisopropanolamine was added, and finally 138 parts of potassium carbonate was added over a period of 5 to 10 minutes. Water was then distilled from the mixture at atmospheric pressure to produce an aqueous concentrate which contained, in each 100 parts of solution, approximately, 25–30 parts of the dissolved tetra-alkali metal salt (mixed sodium and potassium) of 4,4' - bis(4 - p - sulfoanilino - 6 - diisopropanolamino-s-triazin - 2 - ylamino) - 2,2' - stilbenedisulfonic acid, 5–6 parts of sodium chloride, 3–4 parts of potassium chloride and 2–3 parts of diisopropanolamine.

To the above concentrate was added 730 parts of dipropylene glycol and the solution was then diluted with sufficient water to obtain a solution which contained in each 100 parts of solution approximately 20 to 25 parts of the active fluorescent whitening agent. The resulting clear solution was found to have excellent storage stability at temperatures as low as 15° F.

Compositions of this invention wherein the concentration of the fluorescent whitening ingredient varies, for example, 10, 15, 20, 25 or 30 percent by weight, are conveniently prepared either by further concentration or further dilution of the above reaction mixture. Concentration is preferably accomplished before the addition of the co-solvent, and dilution, after the addition of the co-solvent.

EXAMPLE 2

A padding solution was prepared by mixing 120 parts of a water solution containing 45 percent dihydroxyethylene urea resin, 25 parts of a 30 percent aqueous magnesium chloride solution, 2.5 parts of the composition of Example 1, and 778 parts of water. Approximately 10 feet of a 9 inch wide strip of percale cotton having 80 x 80 threads to the inch was given a single padding through a 100 ml. portion of the clear, freshly-prepared solution and was nipped to approximately 85 percent pickup on the weight of the fabric. The padded strip was air-dried at room temperature and then cured at 325° F. for three minutes. The resin-finished fabric was laundered in a standard detergent wash solution for two minutes at 180° F., given two fresh water rinses for two minutes, each at 180° F., and finally ironed dry on a drum dryer. The cloth thus treated had a remarkable white brilliance when examined visually in north light, and when compared in a reflectometer, was outstandingly whiter than cloth treated in the same manner with the same resin-finish bath but containing no whitener.

Two hours after the preparation of the padding solution, another sample of the same stock of 80 x 80 cotton percale was padded with another 100 ml. portion of the aged, and still clear, padding solution. The cloth was air-dried, cured, and laundered as described above. The amount of whiteness and the intensity of the fluorescence imparted to this cloth, when compared visually and with a reflectometer, was substantially the same as that of the cloth padded with freshly-prepared resin-accelerator-brightener solution.

The remainder of the ageing padding solution was examined 24 hours after its preparation and was found to be clear and free of any cloudiness or turbidity. The retention of substantially unchanged dyeing properties together with no evidence of clouding in the aged padding solution are indicative of the excellent pot life of the composition of Example 1 when used in a resin-magnesium chloride accelerator system.

EXAMPLE 3

A 9 inch wide strip of 80 x 80 (threads to the inch) percale cotton approximately 10 feet long was given a single padding through a 100 ml. portion of a clear, freshly-prepared resin-finishing solution prepared by mixing 180 parts of a water solution containing 45 percent methylol imidazolidone monomer, 65 parts of a 25 percent aqueous zinc nitrate solution, 0.8 part of the composition of Example 1, and 80 parts of water. The pH of the solution was adjusted to pH 3.5 with glacial acetic acid. The padded cloth was nipped to approximately 85 percent pickup on the weight of the fabric and was then air-dried at room temperature. The resin-finished strip was then cured for three minutes at 325° F. and was finally laundered in a standard detergent wash solution for two minutes at 180° F. The cloth was then rinsed twice for two minutes for each rinse with fresh water at 180° F. and finally ironed dry on a drum dryer. The cloth treated accordingly had an excellent white brilliance when examined visually under north light, and when compared in a reflectometer, was substantially whiter than cloth treated in the same manner with the same resin-finished bath but containing no whitener.

Another sample from the same stock of 80 x 80 cotton percale was treated as described above with a second 100 ml. portion of the aged, and still clear, padding solution two hours after its preparation. The degree of whiteness and the intensity of the fluorescence imparted to this cloth when compared both visually and with a reflectometer, was substantially the same as that of the cloth padded with freshly-prepared resin-accelerator-brightener solution.

The remainder of the padding solution was examined after ageing for 24 hours and was found to be clear and free of any turbidity or separated precipitate. The retention of full dyeing level and the unchanged appearance of the aged padding solution are indicative of the excellent pot life of the composition of Example 1 when used in a resin-zinc nitrate accelerator padding system.

We claim:

1. A stable, aqueous fluorescent whitening composition for whitening cotton fibers concomitantly with the application of thermosetting textile resins which contains as the essential fluorescent whitening ingredient a dissolved tetra-alkali metal salt of 4,4'-bis(4-p-sulfoanilino-6-diisopropanolamino-s-triazin-2-ylamino) - 2,2' - stilbenedisulfonic acid and a co-solvent selected from the group consisting of polyhydric alcohols, diglycol ethers, polyethylene glycols of the formula $H(OCH_2CH_2)_nOH$, wherein $n$ is an integer from 4 to 6, and alkanolamines of the formula $(HO-alk)_p—NR_{3-p}$ wherein alk is a bivalent alkane radical of 2 to 4 carbon atoms, R is hydrogen or alkyl of 1 to 2 carbon atoms, and $p$ is an integer from 1 to 3.

2. An aqueous composition according to claim 1 which contains approximately 10 to 30 percent by weight of the dissolved tetra-alkali metal salt of 4,4'-bis(4-p-sulfoanilino-6-diisopropanolamino-s-triazin - 2 - ylamino)-2,2'-stilbenedisulfonic acid and approximately 5 to 15 percent by weight of a diglycol ether containing 4 to 6 carbon atoms.

3. A composition according to claim 2 wherein the dissolved alkali-metal salt is the disodium dipotassium salt and the co-solvent is dipropylene glycol.

References Cited

UNITED STATES PATENTS

| 3,012,971 | 12/1961 | Gessner et al. | 252—301.2 W |
|---|---|---|---|
| 3,025,242 | 3/1962 | Seyler | 252—301.2 W |
| 3,360,479 | 12/1967 | Hausermann | 252—301.2 W |

FOREIGN PATENTS

| 896,533 | 5/1962 | Great Britain. | |
|---|---|---|---|
| 740,785 | 8/1966 | Canada | 252—301.2 W |

DANIEL E. WYMAN, Primary Examiner

A. P. DEMERS, Assistant Examiner

U.S. Cl. X.R.

117—33.5 T; 252—301.3 W; 260—240 B